Figure 1:
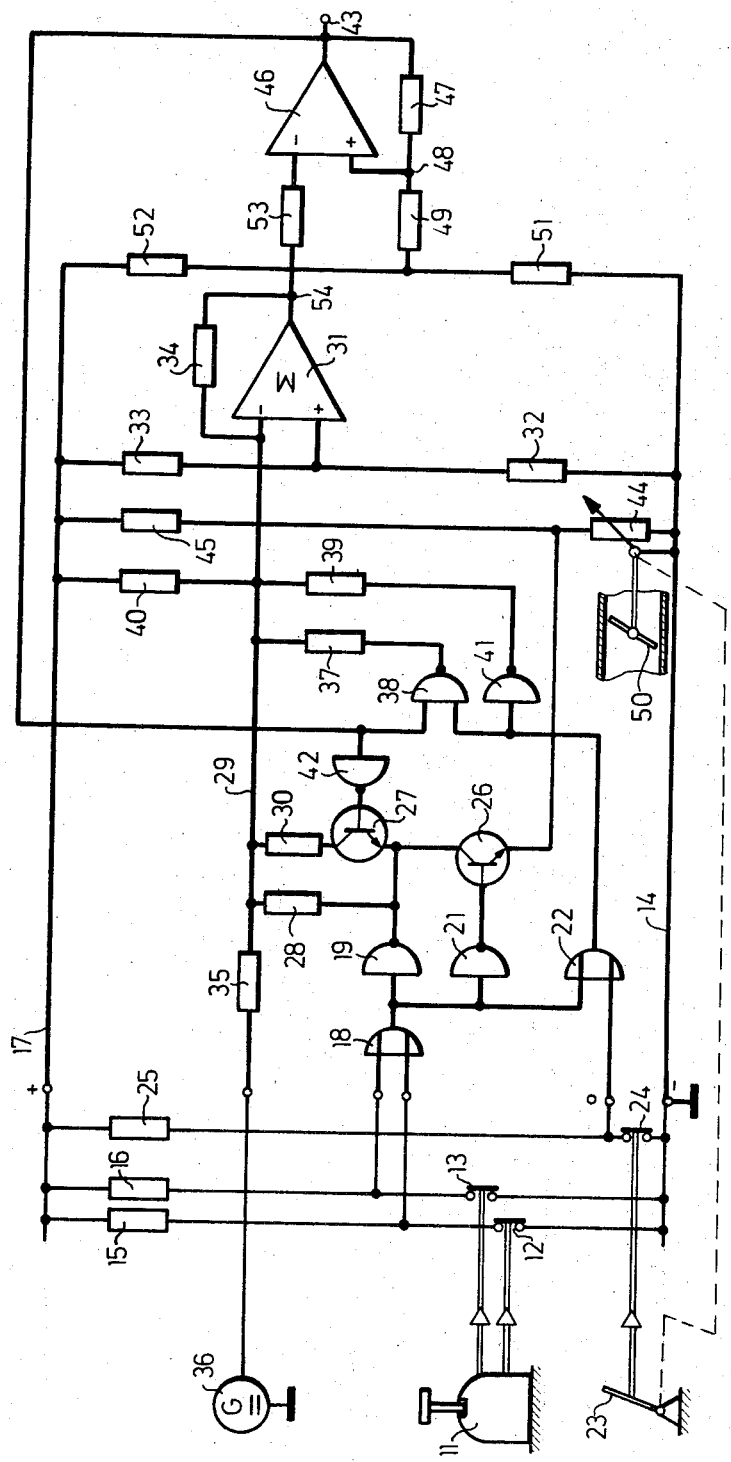

United States Patent [19]
Flaig

[11] 3,826,158
[45] July 30, 1974

[54] ELECTRONIC SHIFT COMMAND SYSTEM FOR MOTOR VEHICLE AUTOMATIC TRANSMISSION

[75] Inventor: Ulrich Flaig, Stuttgart, Germany

[73] Assignee: Robert Bosch GmbH, Stuttgart, Germany

[22] Filed: Oct. 19, 1972

[21] Appl. No.: 298,986

[30] Foreign Application Priority Data
Jan. 5, 1972    Germany.......................... 2200409

[52] U.S. Cl. ................................. 74/866, 74/752 D
[51] Int. Cl. ......................... B60k 21/00, F16h 3/74
[58] Field of Search ........................... 74/866, 752 D

[56] References Cited
UNITED STATES PATENTS

| | | | |
|---|---|---|---|
| 3,653,281 | 4/1972 | Shirai | 74/866 X |
| 3,680,410 | 8/1972 | Sumyoshi et al | 74/866 |
| 3,726,159 | 4/1973 | Mizote | 74/866 |
| 3,739,661 | 6/1973 | Harrison | 74/866 |

Primary Examiner—Samuel Scott
Assistant Examiner—P. S. Lall
Attorney, Agent, or Firm—Flynn & Frishauf and William R. Woodward

[57] ABSTRACT

A Schmitt trigger circuit, the switching of which is used to command shifting of an automatic transmission from one gear to another or back again, is driven by a summing amplifier responsive to a voltage proportional to vehicle speed, to a voltage inversely proportional to motor loading as indicated by the position of the throttle and also to two-valued conditions related to actuation of a kickdown switch and of a shift range limiting selector switch. The circuit design and logic is such that with the Schmitt trigger operating at fixed switching thresholds, the vehicle speed of no load upshift, full load upshift, kickdown upshift, no load downshift, full load downshift and kickdown downshift can be respectively determined by the independent choice of value for individual resistors in the circuit. When more than one shift stage is involved summing amplifiers and Schmitt triggers must be duplicated, but a common speed signal source and a common load signal source may be used.

15 Claims, 3 Drawing Figures

ELECTRONIC SHIFT COMMAND SYSTEM FOR MOTOR VEHICLE AUTOMATIC TRANSMISSION

This invention relates to an electronic control system for shifting an automatic transmission of a motor vehicle from one gear to another, and in particular to a control system which combines a number of electrical signals coming from various sources, such as a vehicle speed indicator, a gear selection lever, the throttle positioning mechanism and a kickdown switch operated at the fully depressed level of the acceleration pedal in a single two-valued signal to command an upshifting or a downshifting operation of the transmission.

The control of automatic transmissions of motor vehicles for accomplishing the shifting of gears has been accomplished by hydraulic or mechanical controls in the heretofore usual systems. In such systems it was therefore difficult or indeed not possible to fit the control for the shifting of the transmission to several different determining conditions or to subject the control system to the will of the driver. The critical conditions determining when a shift of gear should take place were not easy to set, and the adjustment of a motor vehicle automatic transmission was very difficult. Expensive and bulky apparatus was necessary to properly set up shifting mechanisms.

The object of the invention is to provide for the shift of gears by the assistance of an electronic control system which is simple and compact in construction and with which the critical upshift and downshift points can be set without difficulties.

SUBJECT MATTER OF THE PRESENT INVENTION

Briefly, for shifting from a first gear up to a second gear, or down from the latter to the first gear, a bistable circuit such as a Schmitt trigger, conveniently provided by a circuit including an operational amplifier, is arranged to command a shift from a lower to a higer gear, or vice versa, for at least the first four and preferably all of the following conditions: no load upshift, full load upshift, no load downshift, full load downshift, kickdown upshift and kickdown downshift. In order to accomplish these functions the operational amplifier of the Schmitt trigger circuit is driven by a summing circuit that likewise utilizes an operational amplifier. The summing circuit is so organized that the respective critical points for each of the shifting operations just mentioned can be set by the magnitude of substantially independent circuit parameters (in practice, they are all resistor values) which may be designed into the circuit, or individually any or all of them may be made adjustable in the equipment. In practice it is desired that at least the resistor which determines the kickdown upshift point should be precisely adjusted, while all or most of the other resistors determining shift points may be fixed resistors of approximately designed values.

A suitable generator provides an electrical voltage that varies with the vehicle speed and its characteristics, modified with a series resistance if appropriate, together with the value of a summing resistance, determine the vehicle speed at which the no load upshift operation occurs. A variable resistance, the value of which is controlled by the position of the throttle, determines in association with certain other circuit elements the vehicle speed at which upshift will occur at various levels of load as determined by the position of the throttle. Certain other circuit elements determine the relation between the upshift and downshift points (which may be regarded as the hysteresis of the Schmitt trigger circuit). A feedback resistor of the Schmitt trigger circuit is used to determine this relation in order to fix the no load downshift point. The upshift and downshift points can be caused to be spread farther apart as the load increases by dividing the resistance through which the variable voltage controlled by the throttle is applied by the summing circuit into two parallel resistors, one of which is switched out by a transistor when the Schmitt trigger circuit is in the higher gear condition, so that this resistor plays no part in determining the downshift point. The effect of this added hysteresis increases with load. The magnitude of the other resistor of the pair is set to provide the desired full load downshift point.

A contactor opened when the accelerator pedal is fully depressed, operating through a resistor and gate network on the summing circuit, causes the summing amplifier to shift the full load upshift and downshift points towards higher vehicle speed, which may be, in the case of the upshift point, the vehicle speed corresponding to the highest permissible engine speed when the transmission is in the lower of the two gears in question. Here again two resistors are used. In this case one of them determines the kickdown upshift point and the other is switched in parallel to cooperate in determining the kickdown downshift point.

Finally, the gear selector switch of the vehicle may impose limits on the shifting above a particular gear in one or more of its positions and this is done in the control system of this invention by imposing a condition corresponding to the kickdown criteria, so that upshifting will not occur until the highest permissible engine speed has been reached, while at the same time effectively disconnecting the signal produced by the variable resistor connected to the throttle.

When the control system of this invention is used to control shifting between gears in a sequence of more than two gears, a control system as just described is used for each stage, but the same generator for indicating the vehicle speed and the same variable resistance controlled by the throttle may be used for all stages and of course only a single gear selector and accelerator pedal will be involved.

Figure 2:
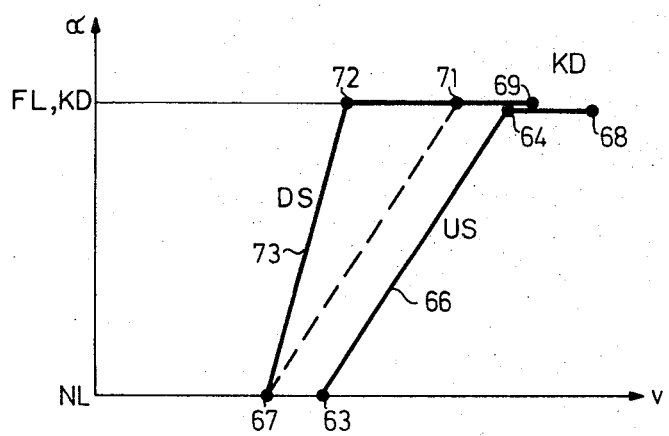
Figure 3:
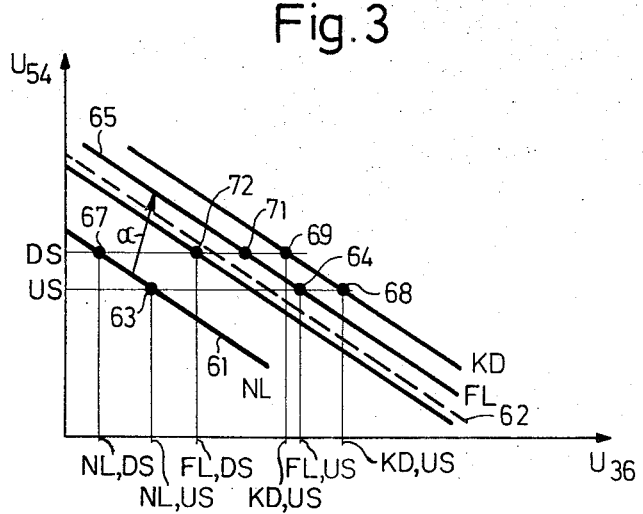

An illustrative embodiment of the invention is described below in detail with reference to the accompanying drawing in which:

FIG. 1 is a circuit diagram of an electronic control system according to the invention;

FIG. 2 is a graph of the switching characteristic of the circuit of FIG. 1 which determines the upshift and downshift points, with vehicle speed plotted as the abscissa and throttle position plotted as the ordinate, and FIG. 3 is a graph of the output voltage of the operational amplifier of the summing stage, plotted as ordinate against the voltage of the speed signal generator as abscissa, for various particular conditions.

In the illustrative embodiment of the invention shown by the circuit diagram of FIG. 1, a first contactor 12 and a second contactor are controlled by a transmission function selector lever 11 and this control may, for example, be simply a mechanical control. A first connection terminal of each of these contactor switches 12 and 13 is connected to the negative bus 14 of the voltage source, which is in turn connected to the vehicle chassis and their respective second terminals are connected over resistors 15 and 16 respectively to the positive bus 17 of the voltage source. These second terminals of the two contactors 12 and 13 are respectively connected to the two inputs of a first OR gate 18. The output of this first OR gate 18 is connected in multiple with the input of first and second inverting gates 19 and 21 and a first input of a second OR gate 22.

A third contactor switch 24 is controlled by the accelerator pedal 23, for example it may be mechanically controlled to open its contacts when the pedal reaches its fully depressed position. A first connection terminal of this third contactor 24 is, again, connected to negative bus 14 and its second connection terminal is connected over a resistor 25 to positive bus 17. In addition, the second connection terminal of third contactor 24 is connected to the second input of the second OR gate 22.

The output of second inverting gate 21 is connected to the base of a first transistor 26, of which the collector is connected to the output of first inverting gate 19 and to the emitter of a second transistor 27. The collector of first transistor 26 is connected over a resistor 28 to a conductor leading to the inverting input 29 of an operational amplifier 31, of which the noninverting input is connected to a fixed reference potential established by resistor 32 connected to negative bus 14 and resistor 33 connected to positive bus 17. A feedback resistor 34 is connected between the output 54 of operational amplifier 31 and its inverting input 29. The collector of second transistor 27 is connected by a resistor 30 to the inverting input 29 of operational amplifier 31, to which is also connected, over a resistor 35, the output of a direct current generator 36 which is coupled to the mechanical output of the vehicle transmission in such a way that its output voltage will be proportional to the speed of travel of the vehicle in which the control system according to the invention is installed.

Also connected to the inverting input 29 of operational amplifier 31 are resistors 37 and 39, the former leading to the output of NAND gate 38 and the latter leading to the output of a third inverting gate 41, of which the input is connected to the output of second OR gate 22 and to the first input of NAND gate 38. The second input of NAND gate 38 is connected to the output terminal 43 of the control system, which is also connected to the input of a fourth inverting gate 42, the output of which is connected to the base of second transistor 27.

A throttle valve 50, operated by the accelerator pedal in the usual way, controls the slider arm of a potentiometer 44 connected as a variable resistor, one terminal of which is connected to negative bus 14 and the other to the emitter of first transistor 26 and also over a resistor 45 to positive bus 17. Potentiometer 44 functions as a load indicator or load signal transmitter and may, for example, be mechanically controlled by the position of throttle valve 50. A summing resistor 40 is connected between inverting input 29 of operational amplifier 31 and the positive bus 17.

Another operational amplifier 46, the output of which is connected to output terminal 43 of the control system is connected in a circuit so as to serve as a Schmitt trigger. For this purpose it is provided with a feedback resistor 47 from its output 43 to its noninverting input 48, from which a decoupling resistor 49 is connected over to a voltage divider consisting of resistor 51 connected to negative bus 14 and resistor 52 connected to positive bus 17. The Schmitt trigger circuit just described is driven over a protective resistor 53 by the output of the summing amplifier constituted by operational amplifier 31 and its associated circuit. Protective resistor 53 is accordingly connected between the output 54 of operational amplifier 31 and the inverting input of operational amplifier 46.

The position of the switching points in the load diagram of the motor is set forth graphically in FIG. 2, the motor itself not being shown in the drawing. The position of the switching points is shown in terms of the vehicle speed $v$ and the throttle valve position $\alpha$. FIG. 3 shows the output voltage of the summing amplifier, which is the voltage at output 54 of operational amplifier 31, as a function of the voltage produced by generator 36, which is proportional to the vehicle speed $v$. The meanings of the symbols and numbers used in FIGS. 2 and 3 is explained together with the manner of operation of the control system shown by circuit diagram in FIG. 1.

The operation of the control system embodying the invention shown in FIG. 1 is as follows. Operational amplifier 46 operates as a Schmitt trigger with fixed switching thresholds. The switching hysteresis, which is the input voltage difference between upshift switching and downshift switching, is set by the value of feedback resistor 47. Another operational amplifier 31, connected as a summing amplifier stage is connected ahead of Schmitt trigger circuit 46, 47 to drive the latter. The noninverting input of operational amplifier 31 is accordingly connected to a fixed reference potential, while the counter-coupling voltage is provided to its inverting input 29 over feedback resistor 34. The output voltage $U_{54}$ of summing stage 31 is set forth in FIG. 3 as a function of the output voltage $U_{36}$ of direct current generator 36, which, as already explained, is proportional to the vehicle speed $v$. Because of the inversion produced by the amplifier 31 the voltage $U_{54}$ goes down as the voltage $U_{36}$ goes up. The lower switching threshold of Schmitt trigger 46 is given by a voltage $U_{US}$ corresponding to upshift line US and the upper switching threshold is determined by a voltage $U_{DS}$ corresponding to a shift line DS.

The load indicating potentiometer 44 is coupled with the throttle valve 50 in such a way that under full load, hence in the case of fully depressed accelerator pedal 23, the resistance of potentiometer 44 is substantially 0 ohms. Under those conditions the throttle valve is then open and the angle $\alpha$ has a value of about 80°. The value of resistor 45 connected in series with load signal potentiometer 44 is so chosen that for maximum effective resistance of potentiometer 44, the voltage drop across this potentiometer is the same as that at the noninverting input of operational amplifier 31 which is serving as a summing stage. The last-mentioned case corresponds to the no load condition, in which throttle valve 50 is closed (engine idling) and accelerator pedal 23 is not at all depressed. It follows that for no load, the resistors 28 and 30 are without effect. In the no load condition, the contacts of third contactor 24 are closed. In normal automatic drive, the contacts of first (12) and second (13) contactors are likewise closed. If, at the same time, the output 43 of Schmitt trigger 46 is substantially at the potential of negative bus 14, the outputs of NAND gate 38 and third inverting gate 41 are positive. Both of these gates have an output switching characteristic that open-circuits the output connection in the positive output condition (and grounds it in the negative output condition). In consequence, in the positive gate output condition on the resistors 37 and 39 are without effect. The value of resistor 40 accordingly fixes the no load characteristic represented by line 61 in FIG. 3. If the value of resistor 40 were infinitely large, that would result in the dashed characteristic line 62 of FIG. 3.

The value of resistor 40 is so chosen that Schmitt trigger 46 switches at a predetermined no load upshift vehicle velocity at a no load upshift point (NL, US) 63. This point 63 is indicated in FIG. 3 and also in FIG. 2. The no load case occurs when the accelerator pedal 23 is not pressed. In the case of full load the throttle valve is entirely open, which corresponds to a throttle angle $\alpha = 80°$. Potentiometer 44, coupled to throttle valve 50, that serves to supply the load information, then has a resistance value of substantially 0 ohms. Since in this case both first transistor 26 and second transistor 27 are conducting, the parallel circuit combination of resistors 28 and 30 is then connected substantially between the input 29 of summing stage 31 and negative voltage bus 14. By the choice of suitable values of resistors 28 and 30, the desired position of full load upshift point (FL, US) 64 is fixed. The switching point 64 lies on the full load characteristic line 65 in FIG. 3. The full load upshift point 64 is correspondingly shown in FIG. 2. The upshift characteristic line 66 between points 63 and 64 in FIG. 2 runs from no load (throttle valve 50 opening approximately $\alpha = 0°$) to full load (throttle valve 50 opening approximately $\alpha = 80°$) as a function of vehicle speed $v$.

The hysteresis of Schmitt trigger 46 is as already explained above so chosen, by choice of the value of feedback resistor 47, that at no load the downshift operation occurs at a particular no load downshift point (NL, DS) 67. The NL, DS point, 67 of course lies on the no load characteristic line 61 of FIG. 3 and also on the ordinate drawn as no load line in FIG. 2. At no load, therefore, upshift occurs in FIG. 2 and also in FIG. 3 at point 63 and downshift at point 67.

In the case of a motor condition between no load 63 and full load 64, hence under partial load, the upshift point lies on the upshift characteristic line 66 of FIG. 2. The greater the opening of throttle valve 50, the more the upshift point US is shifted towards higher vehicle speeds. If the accelerator pedal 23 is fully depressed, the kickdown condition occurs. In the kickdown case (KD) resistor 39 is connected to negative battery by gate 41 operating as an inverter. Third inverter gate 41 is constituted as a switching stage which opens the output in one position and grounds it in the other. The value of resistor 39 sets the kickdown upshift point (KD, US) 68 found in the characteristic lines shown in FIGS. 2 and 3. Under these conditions an upshift occurs only if in the already operating gear the maximum permissible engine speed for this gear is exceeded, at point 68, hence likewise the maximum permissible vehicle speed $v$ for this gear.

The kickdown downshift point (KD, DS) 69 in FIG. 2 and FIG. 3 is determined by the magnitude of resistor 37. If the kickdown downshift operation takes place and Schmitt trigger 46 has operated, and hence the potential of the output terminal 43 is substantially equal to the potential of positive bus 17, resistor 37 is then connected to the chassis ground by the operation of NAND gate 38. NAND gate 38 also has an open output when its input is negative (i.e., grounded).

In the case of motors with a high ratio of motor torque to vehicle weight, it is often desirable for the downshift hysteresis to be greater than the hysteresis for upshifting. This has, in particular, the result that shifting operations are less frequent and that driving comfort is thereby increased. Frequent shifting is also not desirable in the cases of high torque motors installed in relatively light vehicles. Without modification the downshift characteristic line DS in FIG. 2 would pass through the switching point 71. In order to increase the hysteresis as just explained, however, the second transistor 27 is blocked in nonconducting condition during the downshift operation. This blockage is performed by fourth inverting gate 42 when the potential of output terminal $U_{43}$ of the control system is equal to the potential of positive voltage bus 17. In this case, accordingly, resistor 30 is without effect. The full load downshift point (FL, DS) 72 of FIG. 2 and FIG. 3 is thus determined only by the value of resistor 28 in FIG. 1. The downshift characteristic line 73, connecting points 72 and 67, describes the possible positions of the downshift point in the case of partial load.

In automatic transmission systems, it is possible by means of the selector switch 11 to limit the number of available automatically switched gears. Instead of allowing all gears to be automatically switched, the driver can decide, for example, in the case of a downhill run, that the highest gear shall be second gear. First contactor switch 12, connected with selector switch 11, is provided for such a case. If the automatic transmission is limited at second gear by selector 11, contacts 12 are then open, the output of first OR gate 18 is positive and the outputs of first and second inverter gates 19 and 21 are negative. First inverter gate 19, which is provided with an open positive output, switches resistors 28 and 30 over to negative bus 14. In this manner the full load condition is simulated. Second inverting gate 21 blocks first transistor 26 and thus cuts off the connection to the load signal potentiometer 44. Second OR gate 22, also controlled by first gate 18 switches to a positive output, thereby simulating a kickdown condition.

The electronic control system according to this invention serves to provide a gear shift signal upon reaching a particular switching threshold which depends upon vehicle velocity $v$ and throttle valve position $\alpha$. The usual automatic motor vehicle transmissions have three gears, so that gear shift from first into second and from second into third gear are to be controlled and vice versa. For control of such a three gear drive two control systems are to be used, each in accordance with the invention here described. A single load signal control 44 with its associated resistor 45 and a single direct current generator 36 will suffice, however, for two or more stages of shift control. The additional shift control stages connected at the junction of load signal control 44 and its associated resistor 45 ought not to be influenced by the output of first inverting gate 19 in the case of a limitation of the scope of the automatic transmission. For this reason first transistor 26 is inserted in the above-described manner in the connection between the output of first inverting gate 19 and the junction of load signal element 44 and its associated resistor 45. By virtue of the provisions of the control system according to this invention, limitation of the scope of the automatic transmission takes effect independently of motor loading, and hence independently of the position of throttle valve 50 and of the position of the slider of load signal potentiometer 44. If the motor is accelerated from a lower to a higher speed, the Schmitt trigger switches further only at the vehicle speed $v$ corresponding to the point 68. On the other hand the system also operates as a protection against overdriving the motor. If the driver actuates selector switch 11 for the purpose of limiting the transmission at a moment in which the vehicle speed $v$ is greater than the maximum permissible velocity for second gear, the Schmitt trigger 46 will switch only when the motor has reached the highest permissible speed. This is the speed which corresponds to the kickdown condition in second gear, hence the point 69 in FIGS. 2 and 3.

A number of additional advantages are found in the control system according to this invention, besides those already mentioned. The operation of the circuit is basically independent of the temperatures that occur in the operation of a motor vehicle, because only switched transistors and thermally stable operational amplifiers are used. If a switching diagram according to FIG. 2 and also according to FIG. 3 is prescribed, all the resistors involved in the design are simple to calculate because only simple linear functions are involved in the calculation and because only voltage and current relations are to be calculated. In particular, no successive approximation evaluations are necessary in the case of shift control systems according to the invention. A particular advantage of the shift control systems of the invention is that in the case of mass production, only the resistor 39 which corresponds to the kickdown upshift point needs to be precisely trimmed. Fixed resistors may be used for all the other resistors.

As already mentioned above, the other switching points are not affected by the adjustment of resistor 39. The overdrive protection in the case of downshifting with the shift selector is simply realizable and already present circuit elements of the shift control system can be used in it.

In the above-described illustrative embodiment of the shift control system of the invention, the full load hysteresis is made greater than the no load hysteresis. By replacing the fourth inverting gate 42 with an ohmic resistance and corresponding redesign of the magnitude of resistors 28 and 30, the full load hysteresis can be made less than the no load hysteresis. This may be desired in the case of high performance sport vehicles.

If the operational amplifiers, gates and transistors are produced according to integrated circuit technology, with the precision trimmed resistor, however, capable of being externally plugged in, the entire shift control system can be housed in a single casing while yet the equipment can be fitted to any prescribed switching program.

Although the invention has been described in connection with a single illustrative embodiment, it will be understood that various modifications may be made within the inventive concept without departing from the spirit of the invention. For instance, the invention has been described with reference to an example in which the negative pole of the automobile battery is connected to the chassis. In cases in which the positive terminal of the battery is connected to the chassis, it may prove convenient, rather than to use the same circuit with the positive battery bus 17 connected to the chassis, to provide an equivalent circuit with transistors of the opposite conductivity type and with operational amplifiers with the inverting input used for the connections shown in the described example for the noninverting input and vice versa.

For purposes of clarity in the specification and claims, certain circuit elements have been given names relating to their function rather than to their particular qualities as components, for example "hysteresis resistor 47", "pull-up resistor 45" and "kickdown downshift gate 38". In each case, the type and electrical value of component suitable for the particular circuit element will be apparent to those skilled in the art. A resistor may of course be made up of two or more component resistors; it is one resistor in the circuit sense if the various components merely cooperate to determine the electrical resistance between two points of a circuit between which there is no circuit branching point.

We claim:
1. An electronic control system for shifting an automatic transmission of the motor of a vehicle from one gear to another comprising:

bistable switch means (46, 47, 49, 51, 52, 53) for commanding the shift of said transmission from a lower to a higher gear in going from a first to its two conditions to the second of its conditions (upshift), and vice versa (downshift);

summing circuit means (31, 34, 29, 40) for controlling said switch means (46, etc.) having a plurality of signal input connections;

means (36) for generating a voltage proportional to the speed of the vehicle to which said transmission belongs and supplying said voltage to said summing circuit means;

a variable element (44) controlled in relation to the position of the throttle (50) of said motor and arranged to supply a signal to said summing circuit means;

and circuit logic means (15, 16, 18, 19, 21, 22, 25, 26, 27, 28, 30, 35, 37, 38, 39, 41, 42) for causing said switching means (46, etc.) to switch and having electrically resistive components (28, 30, 37, 39) for setting by their electrical resistance the switching thresholds for at least the first two of the following conditions, to wit, full load upshift (64), full load downshift (72), kickdown upshift (68), and kickdown downshift (69), in which circuit logic means said thresholds are in each case determined by substantially independent circuit parameters provided by said resistive components (28, 30, 37, 39), in which the no load upshift condition is determined by the magnitude of a resistive component (40) of said summing circuit means, in which the no load downshift condition (67) and the no load hysteresis of said switch means (46, etc.) are determined by the magnitude of a hysteresis resistor (47), and in which means responsive to the condition of said switch means and that of said variable element and including one of said resistive components (30) are provided for causing the hysteresis of said switch means to vary with the position of said throttle (50), the magnitude of the last mentioned resistive component (30) serving to set the full load hysteresis of said switch means.

2. An electronic control system as defined in claim 1 in which said switch means includes an operational amplifier (46) connected to operate as a Schmitt trigger and having a first input connected to a fixed reference potential (51, 52) and a second input of polarity opposite to that of said first input connected to the output of a second operational amplifier (31) included in said summing circuit means and therein connected as a summing stage with a first input connected to a second fixed reference potential (32, 33) and a second input of polarity opposite to said first input, connected in multiple to the respective circuits of signals to be summed.

3. An electronic control system as defined in claim 2 in which said variable element (44) controlled in relation to the position of said throttle (50) is a variable resistance provided with a pull-up resistor of such value as to provide at the junction of said pull-up resistor and said variable resistor a potential under no load conditions (61) equal to said fixed potential connected to said first input of said operational amplifier (31) of said summing means (31, 34, 29, 40); in which, further, the series combination of said pull-up resistor (45) and said variable resistor (44) is connected between the positive (17) and negative (14) busses supplying electric potential to said system; and in which, further, the magnitude of said pull-up resistor (45) contributes to the determination of the full load downshift threshold (72) of said switch means, to which resistive components (28, 30) of said logic means respectively determinative of the full load upshift condition and the full load hysteresis of said switch means also contribute.

4. An electronic control system as defined in claim 3 in which said resistive components (28, 30) determinative of the full load upshift condition and the full load hysteresis of said switch means are adjustable.

5. An electronic control system as defined in claim 3 for use with a transmission having a transmission selector switch (11) of which one or more positions are connected respectively to actuate one or more transmission limiting contactors (12, 13) so connected in said circuit logic means as to prevent upshifting beyond a particular gear except under conditions corresponding to maximum permissible engine speed.

6. An electronic control system as defined in claim 5 in which said transmission limiting contactors (12, 13) are connected, in series with transmission limiting resistors (15, 16), respectively between opposite poles of the energizing voltage source of said electronic system and that the respective intermediate junctions are each connected to an input of a transmission limiting OR gate (18) of which the output is connected in multiple to a second (19) and a third (21) inverting gate and to a second OR gate (22), another input of which is connected to said kickdown contactor (24) and said kickdown resistor (25), in which further the output of said second inverting gate (19) is connected over a full load downshift (72) determining resistor (28) to said second input (29) of said second operational amplifier (31) of said summing means (31, 34, 29, 40) and also, over the collector-emitter path of a first transistor (26) to the junction of said variable resistor (44) and said pull-up resistor (45), in which further the output of said third inverting gate (21) is connected to the base of said first transistor (26) and in which further the output of said second OR gate (22) goes to said second input of said kickdown downshift gate (38) and to the input of said kickdown inverting gate (41).

7. An electronic control system as defined in claim 2 in which said resistive component (40) determinative of the no load upshift condition is a summing resistor connected between the second input of said second operational amplifier and a terminal of the energizing voltage source of said system.

8. An electronic control system as defined in claim 7 in which said resistive component (40) determinative of the no load upshift condition and said hysteresis resistor (47) are adjustable.

9. An electronic control system as defined in claim 1 for use in a vehicle having an accelerator pedal throttle control (23) in which a contactor (24) arranged to switch in a kickdown position of said accelerator pedal is connected in series with a kickdown resistor (25), said series combination of kickdown resistor and contactor (24, 25) being connected between opposite poles of the energizing voltage source for said control system and the junction of said contactor and said kickdown resistor being connected into said circuit logic means and in which system, further, means are provided for determination of the kickdown upshift threshold (68) of said switching means (46, etc.) comprising the series connection of an inverting gate (41) and a kickdown upshift resistor (39) connected directly or through other elements between said second input (29) of said second operational amplifier (31) of said summing means (31, 34, 29, 40) and said junction between said kickdown contactor (24) and said kickdown resistor (25).

10. An electronic control system as defined in claim 9 in which said kickdown upshift resistor (39) is adjustable.

11. An electronic control system as defined in claim 9 in which said circuit logic means includes means for determining the kickdown downshift threshold (69) of said switch means (46, etc.) comprising a kickdown downshift resistor (37) and a kickdown downshift gate (38), said kickdown downshift resistor being connected between said second input (29) of said second operational amplifier (31) of said summing means (31, 34, 29, 40) and said kickdown downshift gate (38) and in which said kickdown downshift gate (38) has a first input connected to the output of said switch means (46, etc.) and a second input connected directly or through other elements to said junction of said kickdown contactor (24) and said kickdown resistor (25).

12. An electronic control system as defined in claim 11 in which said kickdown downshift resistor (37) is adjustable.

13. An electronic control system as defined in claim 11 in which said circuit means includes a second transistor (27) having its emitter-collector path in series with the emitter to collector path of said first transistor (26) and in series with a resistor (30) so as to place said last-mentioned resistor (30) in parallel with said full load downshift resistor (28) when said second transistor (27) having its base connected to the output of a fourth inverting gate (42) the input of which is connected to the output of said switch means (46, etc.).

14. An electronic control system as defined in claim 9 in which said circuit logic means is adapted to cause said switching means (46, etc.) to switch for each of the following conditions, to wit, no load upshift (63), full load upshift (64), kickdown upshift (68), no load downshift (67), full load downshift (72) and kickdown downshift (69), in which circuit logic means the upshift and downshift thresholds are in each case determined by substantially independent resistor magnitudes (28, 30, 37, 39, 40).

15. An electronic control system for shifting an automatic motor vehicle transmission having more than two gears from one to another of successive gears in which control of shifting from each one of said gears to a successive gear in either direction of succession is a system as defined in claim 1 and in which the respective systems as defined in claim 1 utilize a common means (36) for generating a voltage proportional to the speed of the vehicle to which said transmission belongs and a common variable element (44) controlled in relation to the position of the throttle (50) of said motor.

* * * * *